(12) United States Patent
Dhanasekaran et al.

(10) Patent No.: US 12,226,040 B2
(45) Date of Patent: Feb. 18, 2025

(54) STEAM OVEN WITH CHECK VALVE AT WATER INLET FOR STEAM BACKFLOW PREVENTION

(71) Applicant: WHIRLPOOL CORPORATION, Benton Harbor, MI (US)

(72) Inventors: Prem Dhanasekaran, Tamil Nadu (IN); Ankur Garg, Pune (IN); Tushar Sopan Jadhav, Pune (IN); Suraj Narendra Kadam, Pune (IN); Harichandra Prabhakar Lambate, Pune (IN); Vishal Shankar Marathe, Pune (IN); Vishal Shrimandhar Masutage, Sangli (IN); Mohasin Nasir Mulla, Pune (IN); Ravindra Balkrishna Salunkhe, Satara (IN); Sujay Sampat Shelke, Pune (IN); Swapnil Anant Wadkar, Phaltan (IN)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 526 days.

(21) Appl. No.: 17/567,967

(22) Filed: Jan. 4, 2022

(65) Prior Publication Data
US 2023/0210297 A1 Jul. 6, 2023

(51) Int. Cl.
*A47J 27/04* (2006.01)
*F22B 37/60* (2006.01)
*F24C 15/00* (2006.01)

(52) U.S. Cl.
CPC .............. *A47J 27/04* (2013.01); *F22B 37/60* (2013.01); *F24C 15/003* (2013.01); *A47J 2027/043* (2013.01)

(58) Field of Classification Search
CPC ..... A47J 2027/043; A47J 27/04; F22B 37/60; F24C 15/003
(Continued)

(56) References Cited

U.S. PATENT DOCUMENTS

| 153,951 A | * | 8/1874 | Hawes | F22D 11/06 |
| | | | | 417/107 |
| 2,687,276 A | * | 8/1954 | Hornsby | F16K 47/00 |
| | | | | 251/303 |

(Continued)

FOREIGN PATENT DOCUMENTS

| CN | 102512087 A | 6/2012 |
| CN | 211202998 U | 8/2020 |

(Continued)

*Primary Examiner* — Vivek K Shirsat
(74) *Attorney, Agent, or Firm* — Price Heneveld LLP (57) ABSTRACT

An oven includes a cooking chamber, a cabinet at least partially surrounding the cooking chamber, and a water reservoir having a reservoir inlet and a reservoir outlet. The oven further includes a water fill assembly including an opening, a water-receiving cavity and a fill outlet from the water-receiving cavity, the water fill assembly defining a fluid flow path in from the opening and out through the fill outlet, a check valve in fluid communication with the fill outlet downstream of the fluid flow path defined by the water fill assembly, the check valve configured in a closed state under a force of gravity on at least a portion thereof and opening by a flow force of fluid out of the fill outlet and through the check valve, and a conduit connecting the check valve with the water reservoir inlet downstream of the fill outlet.

20 Claims, 7 Drawing Sheets

(58) Field of Classification Search
USPC .................. 126/369, 19 R; 219/401, 682
See application file for complete search history.

(56) References Cited

U.S. PATENT DOCUMENTS

| | | | |
|---|---|---|---|
| 6,737,620 B2 | 5/2004 | Kim | |
| 7,045,745 B2 | 5/2006 | Kim | |
| 7,323,662 B2 | 1/2008 | Cho et al. | |
| D608,450 S | 1/2010 | Ishigami et al. | |
| 8,850,968 B2 | 10/2014 | Seguchi et al. | |
| 8,863,654 B2 | 10/2014 | Asami et al. | |
| 8,997,638 B2 | 4/2015 | Park et al. | |
| 9,565,963 B2 | 2/2017 | Jeon et al. | |
| 9,565,964 B2 | 2/2017 | Yang et al. | |
| 9,581,339 B2 | 2/2017 | Yang et al. | |
| 9,814,343 B2 | 11/2017 | Winkelmann et al. | |
| 10,125,978 B2 | 11/2018 | Shibuya et al. | |
| 10,143,327 B2 | 12/2018 | Freeman et al. | |
| 10,288,311 B2 | 5/2019 | Cho et al. | |
| 10,830,430 B2 | 11/2020 | Gattel et al. | |
| 10,945,444 B2 | 3/2021 | Kim et al. | |
| 10,973,359 B2 | 4/2021 | Donarski et al. | |
| 2012/0199015 A1 | 8/2012 | Seguchi et al. | |
| 2013/0087107 A1 | 4/2013 | Zhang et al. | |
| 2015/0253002 A1 | 9/2015 | Shibuya et al. | |
| 2016/0061490 A1 | 3/2016 | Cho et al. | |
| 2018/0070596 A1 | 3/2018 | Kim et al. | |
| 2018/0070757 A1* | 3/2018 | Lee | A23L 5/13 |
| 2019/0309956 A1 | 10/2019 | Buschman et al. | |

FOREIGN PATENT DOCUMENTS

| | | |
|---|---|---|
| CN | 212912777 U | 4/2021 |
| DE | 4040588 C1 | 3/1992 |
| EP | 1192888 B1 | 5/2005 |
| EP | 1955622 B1 | 9/2011 |
| EP | 2518413 A2 | 10/2012 |
| FR | 2958727 A1 | 10/2011 |
| GB | 2190983 A | 12/1987 |
| KR | 100715610 B1 | 5/2007 |
| KR | 100814017 B1 | 3/2008 |
| WO | 2018048255 A1 | 3/2018 |
| WO | 2018146111 A1 | 8/2018 |
| WO | 2019102407 A1 | 5/2019 |

* cited by examiner

STEAM OVEN WITH CHECK VALVE AT WATER INLET FOR STEAM BACKFLOW PREVENTION

BACKGROUND OF THE DISCLOSURE

The present disclosure generally relates to a water reservoir assembly for an oven with steam cooking functionality, and more specifically, to a water reservoir assembly that reduces or eliminates the transmission of oven generated steam through the water reservoir assembly and into the external environment.

Some ovens have the capability to cook a food item in the presence of steam. For example, some ovens include a reservoir that the user can fill with liquid water (hereinafter, liquid water is referred to simply as "water" while water in a predominantly gaseous state is referred to as "steam"). The oven then transforms the water from the reservoir into steam to deliver to an environment around the food item during cooking thereof. However, there is a problem in that steam and water tend to escape from the reservoir during use of the oven, including when the user adds water to the reservoir.

SUMMARY OF THE DISCLOSURE

According to one aspect of the present disclosure, an oven includes a cooking chamber, a cabinet at least partially surrounding the cooking chamber, and a water reservoir having a reservoir inlet and a reservoir outlet, the oven being configured to extract water from the water reservoir via the reservoir outlet to supply steam to the cooking chamber. The oven further includes a water fill assembly including an opening, a water-receiving cavity and a fill outlet from the water-receiving cavity, the water fill assembly defining a fluid flow path in from the opening and out through the fill outlet, a check valve in fluid communication with the fill outlet downstream of the fluid flow path defined by the water fill assembly, the check valve configured in a closed state under a force of gravity on at least a portion thereof and opening by a flow force of fluid out of the fill outlet and through the check valve, and a conduit connecting the check valve with the water reservoir inlet downstream of the fill outlet.

According to another aspect of the present disclosure, a water storage assembly for an oven configured for to supply steam to a cooking chamber thereof includes a water reservoir having a reservoir inlet and a reservoir outlet, the oven extracting water from the water reservoir via the reservoir outlet and a water fill assembly including an opening, a water-receiving cavity and a fill outlet from the water-receiving cavity, the water fill assembly defining a fluid flow path in from the opening and out through the fill outlet. The assembly further includes a check valve in fluid communication with the fill outlet downstream of the fluid flow path defined by the water fill assembly, the check valve closing under a force of gravity on at least a portion thereof to prevent a backflow against the fluid path and into the water fill assembly and opening to allow an infill of water from the water-receiving cavity through the check valve and a conduit connecting the check valve with the water reservoir inlet downstream of the fill outlet.

According to yet another aspect of the present disclosure, an oven includes a cooking chamber, a cabinet at least partially surrounding the cooking chamber, a water reservoir having a reservoir inlet and a reservoir outlet, the oven being configured to extract water from the water reservoir via the reservoir outlet to supply steam to the cooking chamber, and a water fill assembly including an opening, a water-receiving cavity and a fill outlet from the water-receiving cavity. The water fill assembly defines a fluid flow path in from the opening and out through the fill outlet. A conduit connects with the water reservoir inlet downstream of the fill outlet, and a gravity-closing check valve is in fluid communication between the fill outlet and the conduit. The check valve allows a flow of fluid out of the fill outlet and through the check valve and preventing a backflow of steam from the conduit and into the water fill assembly.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to an oven. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
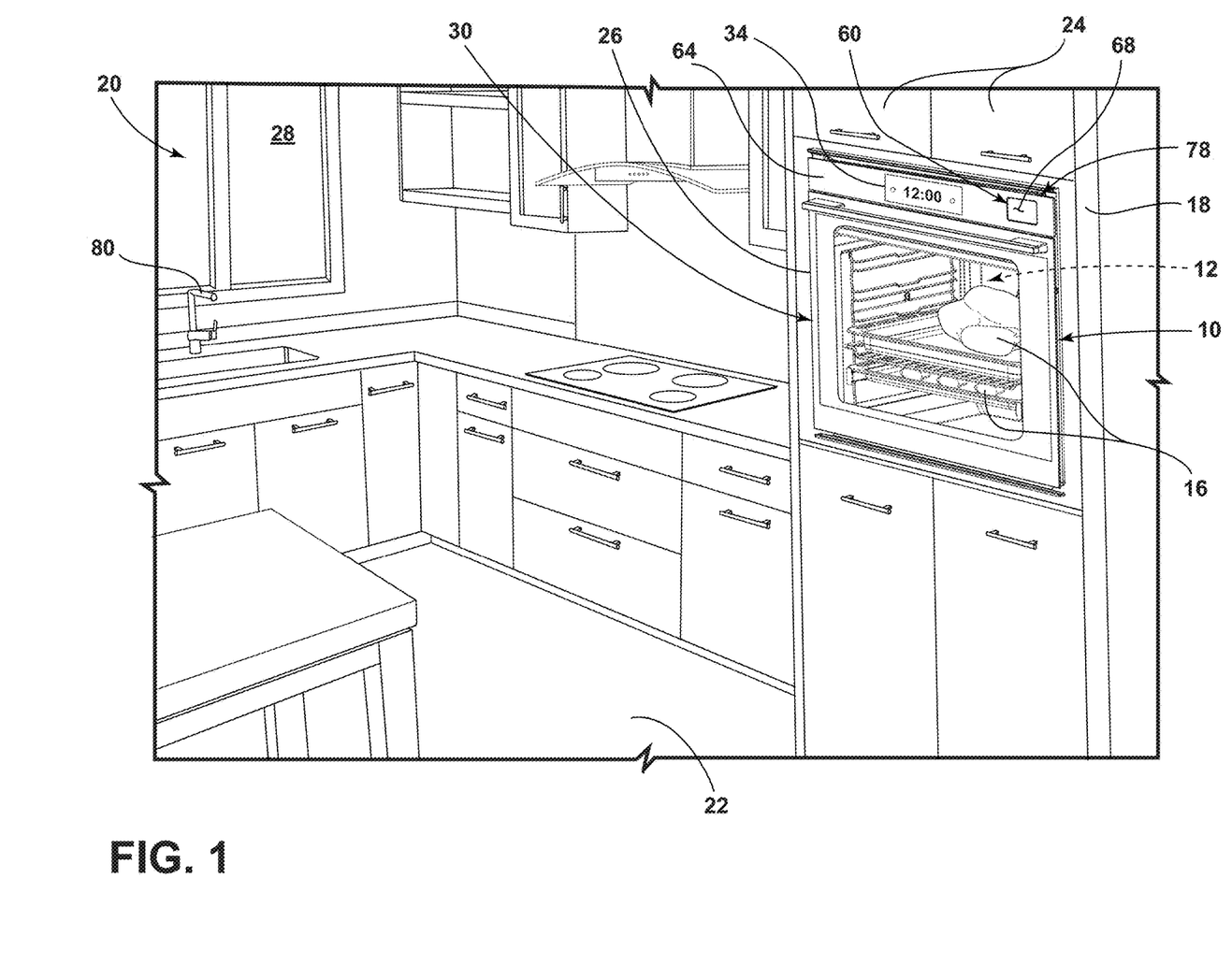
FIG. 1 is a is a view of a kitchen that includes an oven with a water storage assembly of the present disclosure in a water supply state capable of providing water to a steam generation system of the oven to supply steam into a cooking chamber of the oven while cooking one or more food items disposed therein.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front"

shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-9, reference numeral 10 generally designates an oven that includes a cooking chamber 12, a cabinet 14 at least partially surrounding the cooking chamber, a water reservoir 40 having a reservoir inlet 42 and a reservoir outlet 43. The oven 10 is configured to extract water from the water reservoir 40 via the reservoir outlet 43 to supply steam to the cooking chamber 12. A water fill assembly 44 includes an opening 48, a water-receiving cavity 50 and a fill outlet 46 from the water-receiving cavity 50. The water fill assembly 44 defines a fluid flow path 52 in from the opening 48 and out through the fill outlet 46. A conduit 54 connects with the water reservoir inlet 42 downstream of the fill outlet 46, and a gravity-closing check valve 56 is in fluid communication between the fill outlet 46 and the conduit 54. The check valve 56 allows a flow of fluid along the flow path 52 out of the fill outlet 46 and through the check valve 56 and prevents a backflow of steam (i.e., against flow path 52) from the conduit 54 and into the water fill assembly 44.

Figure 2:
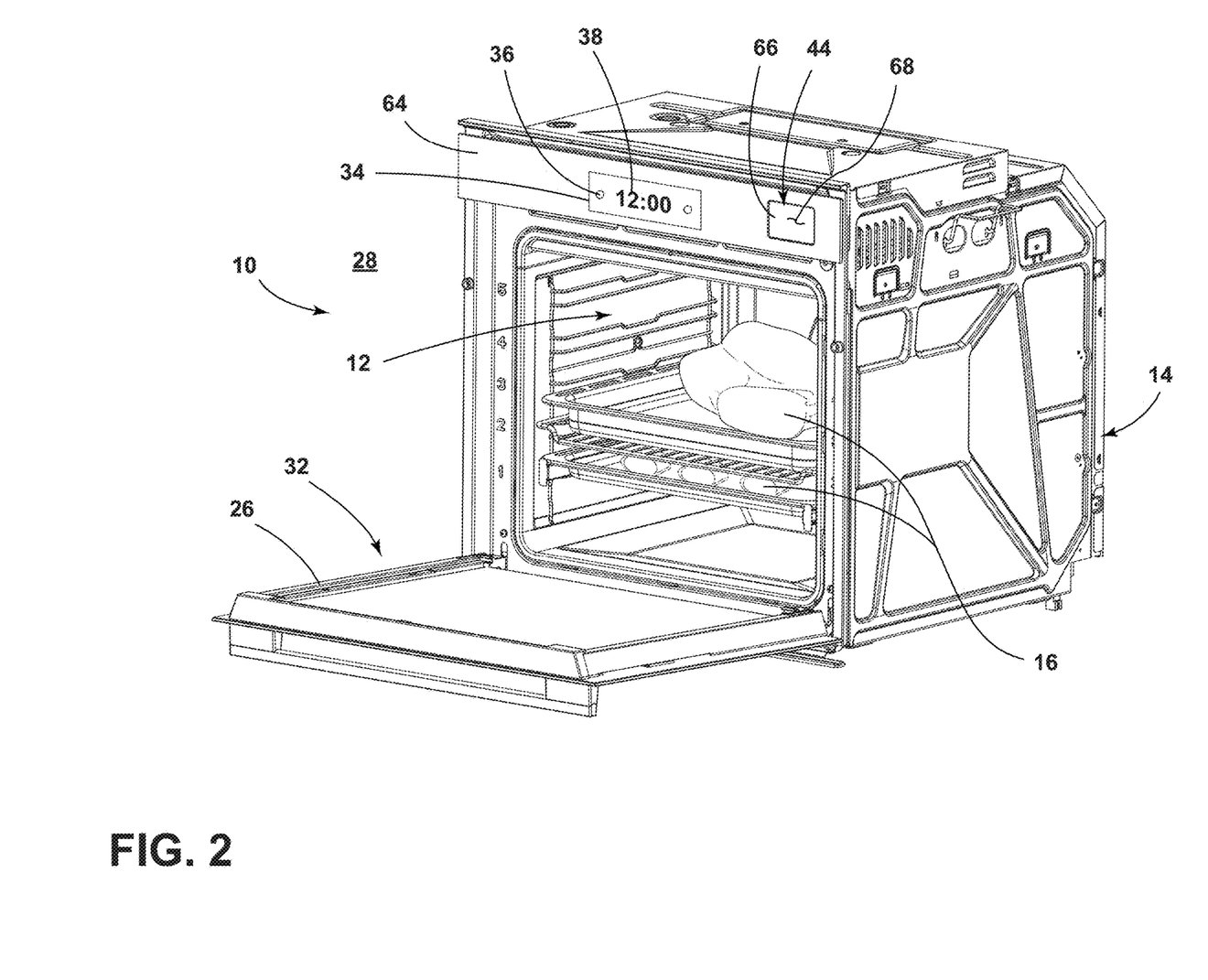
FIG. 2 is a perspective view of the oven of FIG. 1 with the door in an open position that allows access to the cooking chamber from an external environment.
Figure 3:
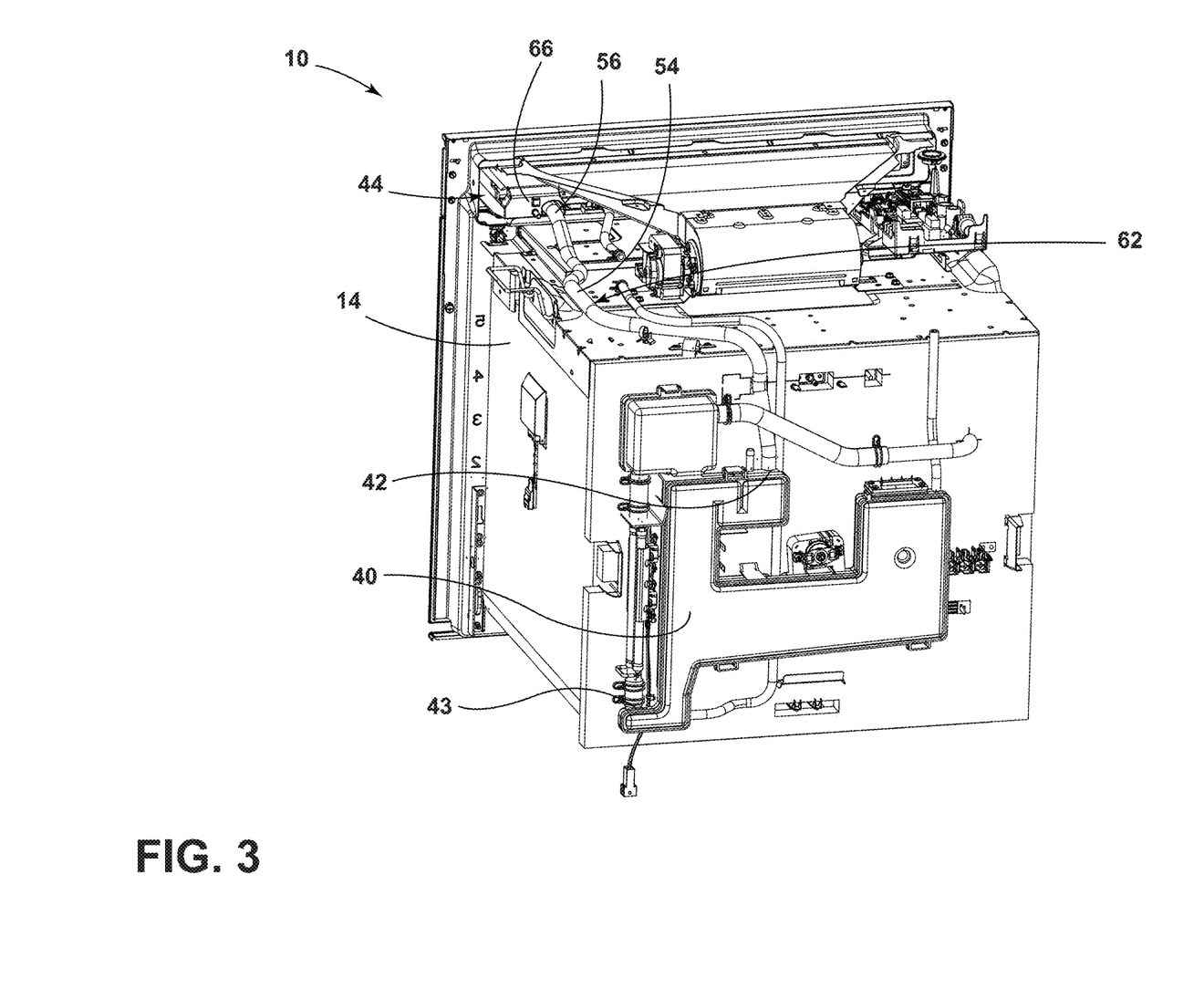
FIG. 3 is a back perspective view of the oven of FIG. 1, showing the water storage assembly of FIG. 1.
Figure 4:
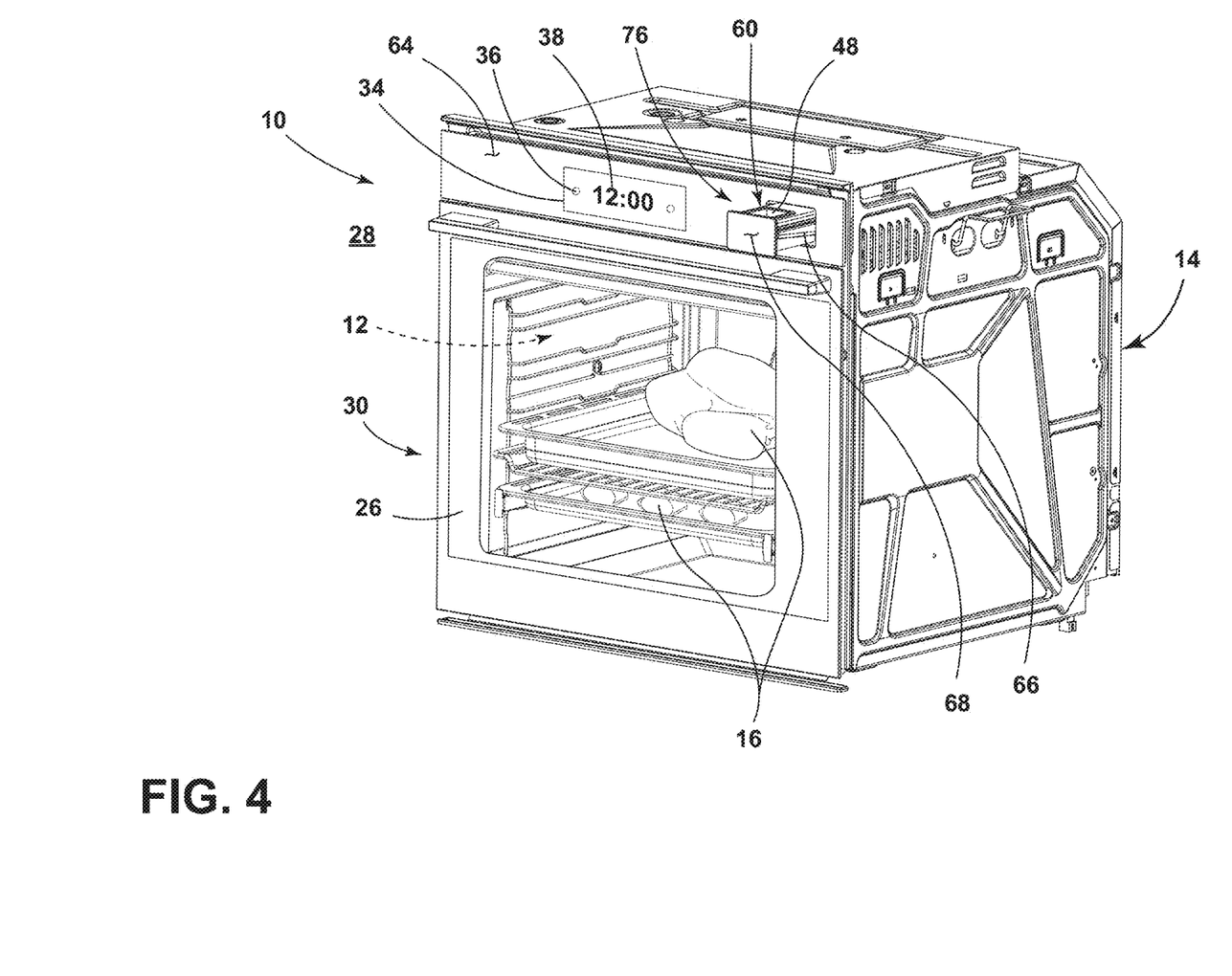
FIG. 4 is a perspective view of the oven of FIG. 1, illustrating the water storage assembly in a fillable state, where the inlet is open to the external environment allowing a user to deposit water into a fill assembly through an inlet.

Referring to FIGS. 1 and 2, the oven 10 is configured to cook one or more food items 16 that are disposed within the cooking chamber 12, such as with a heating element that increases a temperature of the one or more food items 16 disposed within the cooking chamber 12 via electrical resistance, microwave emissions, or the combustion of a gas (e.g., natural gas, propane, butane, and so on). The oven 10 may be considered to be a "wall oven," as illustrated in FIG. 1, where the cabinet 14 of the oven 10 is mostly hidden behind paneling 18 or other structural features of a kitchen 20 or another room where the oven 10 is disposed. The oven 10 may be elevated in such instances from a floor 22 of the kitchen 20 or another room where the oven 10 is disposed. In other embodiments, the oven 10 is part of a "range" unit and further includes a cooktop (not illustrated) disposed above the cooking chamber 12. In such embodiments, the oven 10 (i) may be of the "slide-in" variety where cabinetry 24, paneling 18, or other structural features within the kitchen 20 (or other room) generally hides the cabinet 14 of the oven 10, or (ii) may be of the "freestanding" variety where cabinetry 24, paneling 18, or other structural features of the kitchen 20 (or other room) do not hide the cabinet 14 of the oven 10 but, rather, a covering (not illustrated) covers the cabinet 14 of the oven 10.

The oven 10 further includes a door 26 to selectively deny or allow access to the cooking chamber 12 from an external environment 28. The door 26 includes a closed position 30 (FIG. 1) where the door 26 denies access to the cooking chamber 12 from the external environment 28. In addition, the door 26 includes an open position 32 (see, e.g., FIG. 2) where the door 26 allows access to the cooking chamber 12 from the external environment 28. The door 26 is able to move to, from, and between the closed position 30 and the open position 32. The door 26 may be in the closed position 30 while the oven 10 is cooking the one or more food items 16, so that the cooking chamber 12 retains the heat better that the oven 10 generates. A user of the oven 10 may transition the door 26 from the closed position 30 to the open position 32 to place the one or more food items 16 into the cooking chamber 12 or to remove the one or more food items 16 from the cooking chamber 12, such as after the oven 10 has cooked the one or more food items 16.

In certain implementations, the oven 10 further includes a human-machine interface 34. The human-machine interface 34 may include buttons 36, a touch screen display 38, among other items that allow the user to control operation of the oven 10. The human-machine interface 34 is usable from the external environment 28, and, in one configuration, is disposed above the door 26.

Referring now additionally to FIGS. 3-9, the oven 10 further includes the water reservoir 40. In at least one aspect, the water reservoir 40 is for use with a steam cooking function of the oven 10. The water reservoir 40 includes the inlet 42 that receives water from the fill assembly 44 via the conduit 54 and the outlet 46. The inlet 42 is configured to accept water W for storage in the reservoir 40 from the fill assembly 44. For example, the fill assembly 44 is disposed elevationally above the reservoir 40 so that gravity forces the water W to flow through the conduit 54 into the reservoir 40. The user deposits water W through the opening 48 of the water fill assembly 44 and the water W enters the cavity 50 before flowing out through the outlet 46 and the check valve 56 to enter the conduit 54. The reservoir 40 stores the water W until the oven 10 extracts the water W from the reservoir 40 to generate steam therefrom for a steam cooking function. The oven 10 draws water W from the reservoir 40 through the reservoir outlet 43.

In the illustrated example, the fill outlet 46 is disposed through one of the side walls 58 that define the fill cavity 50. In other implementations, the outlet 46 may be disposed through a bottom surface 60 that defines the fill cavity 50. The outlet 46 is configured to allow the fluid flow path 52 to exit the fill cavity 50 to flow into the conduit 54 for storage in the reservoir 40 until needed by the steam generation system of the oven 10, which is configured to transform the water W into steam for using during a steam cooking function. Steam generation systems for ovens are known in the art, and include any system that heats the water W into steam, which is then introduced into the cooking chamber 12 during cooking of the one or more food items 16. An example of the steam generation system is set forth in United States Patent Application Publication US20190309956A1 (published 10 Oct. 2019, assigned to Whirlpool Corporation), and said publication is incorporated herein by reference in its entirety.

In some aspects, it may be possible for steam generated within the oven 10 to flow from the boiler associated with steam generation back into the reservoir 40. In the above-described arrangement, wherein gravity is used to promote the flow of water W from the fill assembly 44, along fluid flow path 52, through the conduit 54 and into the reservoir 40, the fill assembly 44 is positioned vertically above the reservoir 40 to facilitate such downstream flow. This arrangement, however, may facilitate the upward escape of steam in a backflow (i.e., upstream) direction against the intended flow path 52 such that steam S may tend to flow upward through the conduit 54 and toward the fill assembly 44. In this manner, the above-described gravity-based check valve 56 is present and configured to allow the above-described movement of water W along the flow path 52, while preventing the backflow of steam S from conduit 54 from moving through the fill outlet 46 and into the fill cavity 50, where such steam S may otherwise collect until a sufficient pressure is built up that may cause the steam S to escape the fill assembly 44 and enter the external environment 28. More particularly, as shown in one implementation in FIGS. 5-7, the check valve 56 is in fluid communication with the fill outlet 46 downstream of the fluid flow path 52 defined by the water fill assembly 44. The check valve 56 is gravity-based in that it is configured in a closed state S1 (FIG. 7) under the force of gravity G on at least a portion thereof, depending on the particular implementation of such valve according to the present example of the valve 56, valve 156 as well as other implementations. The valve 56 moves to an open state S2 (FIG. 6) by a force of water flowing along the flow path 52, including out of the fill outlet 46 and through the check valve 56. The water then flows into conduit 54 that connects the check valve 56 with the water reservoir inlet 42 downstream of the fill outlet 46 to fill the reservoir 40, as discussed above.

In a further aspect of the disclosure, the combination of the water fill assembly 44 and reservoir 40 discussed herein can be a component of a water storage assembly 62 useable in connection with the oven 10 described herein and configured for to supply steam S to the cooking chamber 12 thereof. In general, the assembly 44 includes the check valve 56 described herein in fluid communication with the fill outlet 46 downstream of the fluid flow path 52 defined by the water fill assembly 44. The check valve 56 closes under the force of gravity G on at least a portion thereof to prevent a backflow against the fluid path 52 and into the water fill assembly 44 and opening to allow an infill of water from the water-receiving cavity 50 through the check valve 56 and the conduit 54 connecting the check valve 56 with the water reservoir inlet 42 downstream of the fill outlet 46. It will be appreciated that such a water fill assembly 44 may be adapted for use with other appliances that store water for the use in generating and supplying steam. In some aspects, the water storage assembly 62 is described according to specific adaptations for use with the oven 10 described herein. In one such aspect, the oven 10 may further include a front face 64, and the water fill assembly 44 may include a drawer body 66 having an outer surface 68 and defining the opening 48, the water-receiving cavity 50, and the fill outlet 46. The drawer body 66 is movably mounted in a holder 70 so as to be slidable with respect to the holder 70 and the rest of the oven 10. The fill outlet 46 is defined on the drawer body 66, as shown. The drawer body 66, in particular, is slideable with respect to the holder 70 between a fill position P1 (FIG. 1), wherein the opening 48 to the cavity 50 is exposed to the environment 28 surrounding the oven 10, and a closed position P2 (FIG. 4), wherein the drawer body 66 is retracted into the holder 70 and the outer surface 68 of the drawer body 66 is generally coplanar with the front face 64 of the oven 10. In this arrangement, the drawer body 66 is pulled outward into the fill position P1 for the user to pour water through the opening 48 and into the cavity 50, wherein the water moves along the flow path 52 to fill the reservoir 40 (at least partially), as discussed above. The drawer 66 is then pushed back into the closed position P2 for use of the oven 10.

Figure 5:
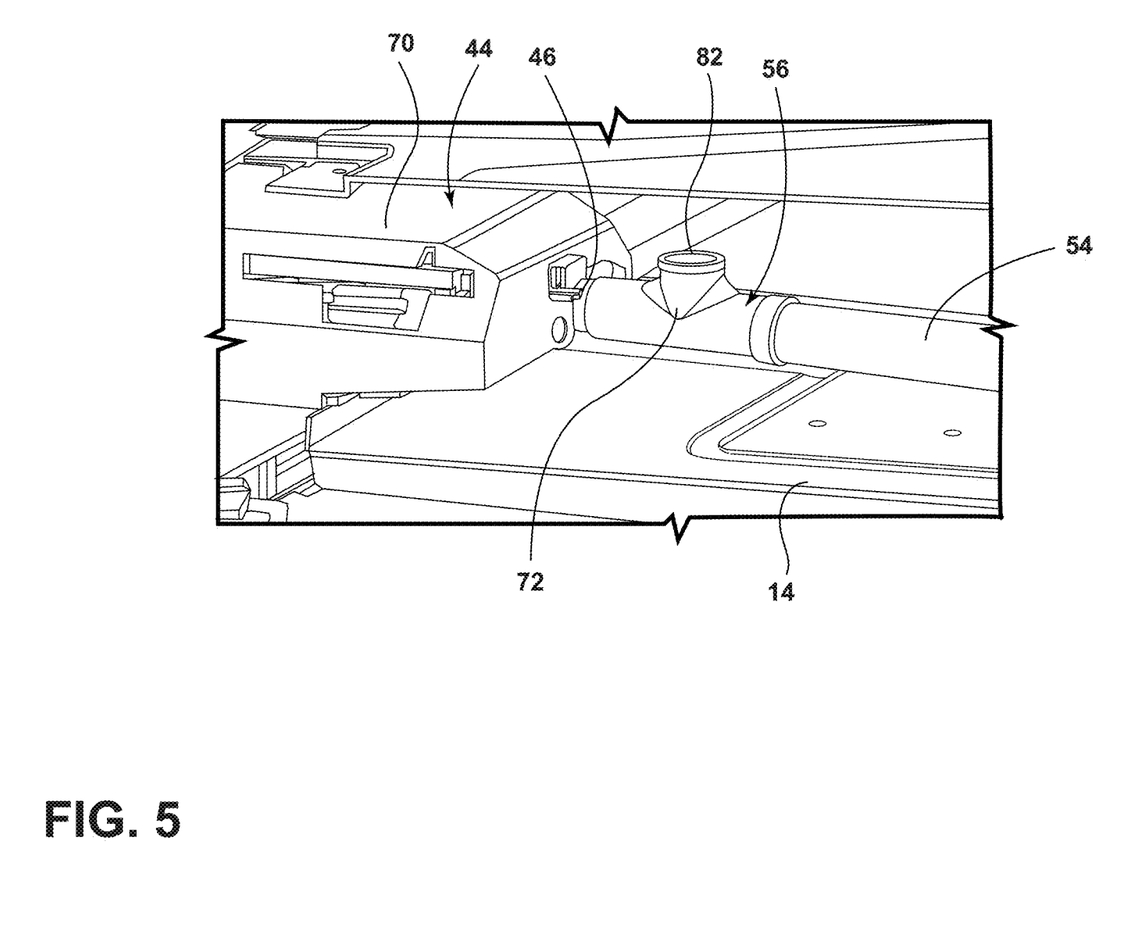
FIG. 5 is a detail view of a portion of the water storage assembly showing a check valve for restricting an upstream flow of steam back into the fill assembly.
Figure 6:
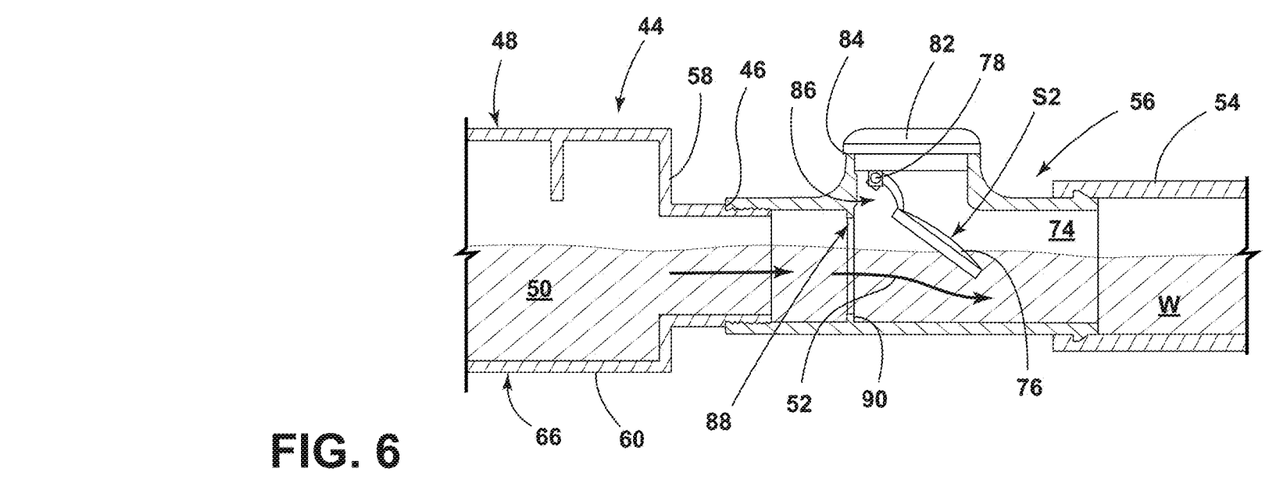
FIG. 6 is a cross-section view of the check valve in an open state, allowing the infill of water therethrough.
Figure 7:
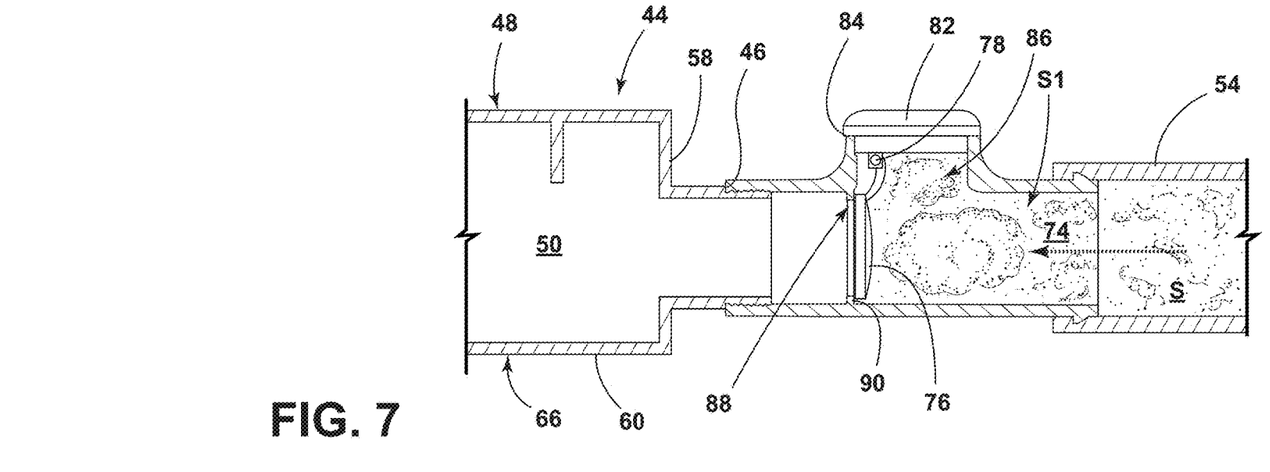
FIG. 7 is a cross-section view of the check valve in a closed state, preventing the backflow of steam therethrough.

In the specific implementation shown in FIGS. 5-7, the check valve 56 includes a valve body 72 that defines a portion of the fluid flow path 52 between the fill outlet 46 and the conduit 54 through an interior 74 of the valve body 72. In this manner, the majority of the valve body 72 can be of a tubular structure that extends horizontally outward from the outlet 46. The valve 56 further includes a flap 76 rotatably mounted within the interior 74 of the body 72. In this arrangement, the flap 76 defines the above-described portion of the check valve 56 that configures the valve 56 between the closed state S1 and the open state S2. As further described herein, the flap 76 defines the portion of the check valve 56 that closes under the force of gravity G and opens to allow water W from the water-receiving cavity 50 to flow through the check valve 56. In this respect, the flap 76 is rotatably mounted within the interior 74 of the valve body 72 about a hinge 78 disposed along an upper portion 80 of the flap 76 such that the flap 76 rotates vertically upward and in a direction away from the fill outlet 46 by the flow force of fluid (i.e., water W) out of the fill outlet 46 and through the check valve 56 to allow the infill of water W through the check valve 56 and into the conduit 54 to fill the reservoir 40. As shown, the flap 76 can, in particular, be mounted on a cap 82 that is coupleable over an access opening 84 to the interior 74 of the valve body 72 and disposed vertically above the fluid flow path 52 such that the flap 76 depends downwardly from the cap 82 into the fluid flow path 52 when in the closed state S1 under the force of gravity G. In one aspect, the access opening 84 can define a secondary cavity 86 that intersects the interior 74 that defines the fluid flow path 52 to provide an enlarged area to receive the flap 76 when moved under the movement of water W along the flow path 52 into the open state S2, as shown in FIG. 7. In a further aspect, the cap 82 may affix to the access opening 84 by a mutually-threaded engagement therebetween for easy assembly of the valve 56, although other arrangements are possible (including press fit, adhesives, or additional mechanical fasteners). The hinge 78 associated with the flap 76 may connect the flap 76 with the cap 82 and may be assembled in a press- or snap-fit arrangement, or may include a hinge pin therebetween.

As further shown in FIGS. 6 and 7, the valve body 72 can define a shoulder 88 having a face 90 disposed away from the fill outlet 46. The shoulder 88 may be defined as a step between a narrow, upstream portion of the interior 74 and a wider, downstream portion or may be defined as a flange surrounding a portion of the interior upstream of the flap 76 in the closed state S1. In the illustrated arrangement, the flap 76 moves into contact with the face 90 of the shoulder 88 to define the closed state S1 of the valve 56. In this arrangement, the flap 76 is urged against the face 90 of the shoulder 88 under an upstream fluid force from steam S flowing against the intended fluid flow path 52 from the conduit 54 toward the fill outlet 46. This arrangement helps maintain the valve 56 in the closed state S1 and can further increase the sealing effect of the flap 76 against the shoulder 88 to decrease the likelihood of steam S moving upstream of the valve 56 and into the cavity 50. In the absence of such steam S, including when the oven is off or not using a steam cooking function, water W may generally freely flow downstream by moving the flap 76 to the open state S2 away from the shoulder 88.

Figure 8:
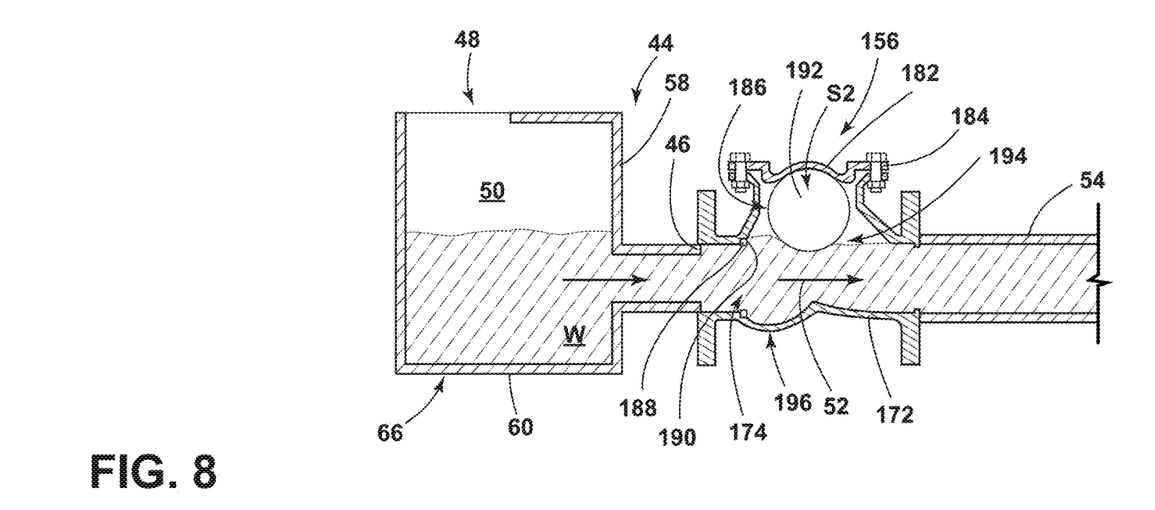
FIG. 8 is a cross-section view of an alternative implementation of a check valve in an open state, allowing the infill of water therethrough.
Figure 9:
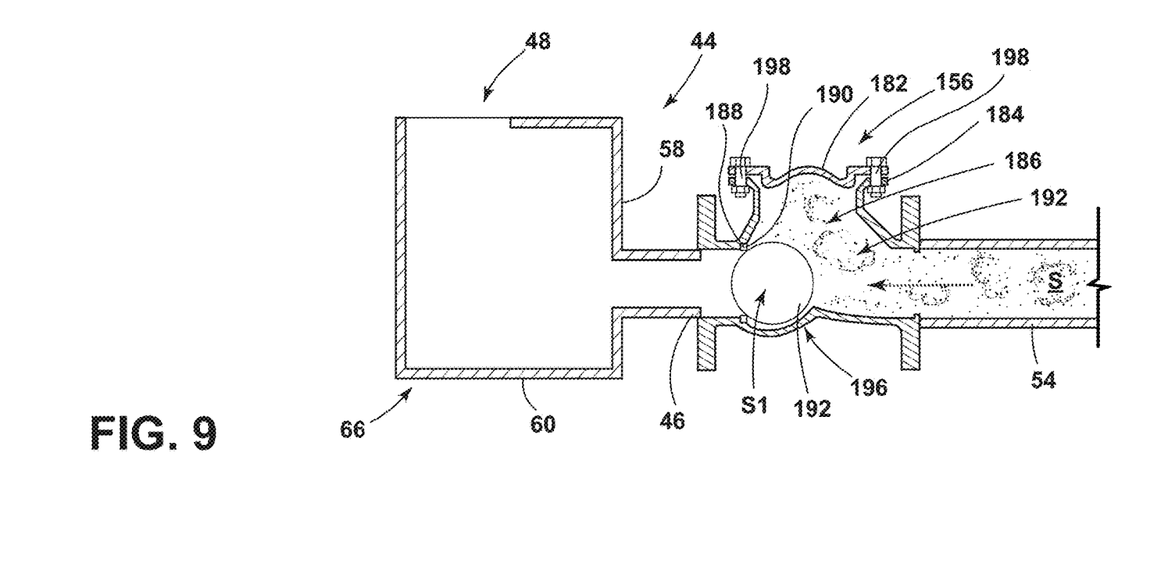
FIG. 9 is a cross-section view of the check valve of FIG. 8 in a closed state, preventing the backflow of steam therethrough.

Turning now to FIGS. 8 and 9 in an alternative implementation, check valve 156 can be used in the same or similar water storage assembly 62, including in connection with the drawer-based implementation for the above-described oven 10. In this implementation, the valve 156 can include a valve body 172 defining a portion of the fluid flow path 52 between the fill outlet 46 and the conduit 54 through an interior 174 of the valve body 172 in a manner generally similar to that which is discussed above. The present check valve 156 can include a ball 192 movably captured within a portion 194 of the interior 174 of the valve body 172. The ball 192, thus, defines the portion of the check valve 156 that is configurable between the closed state S1 and the open state S2 with the ball 192 closing the valve 156 under the force of gravity G and opening to allow water W from the water-receiving cavity 50 to flow through the check valve 156. In particular, the ball 192 has a density that is less than the density of water (such as by being formed of hollow plastic or the like) such that the ball 192 floats into the open state S2 by the presence of water W within the portion 194 of the interior 174 within which the ball 192 is captured, including under the flow of water through the check valve 156 along the fluid flow path 52. As shown, the ball-receiving portion 194 of the interior 174 includes a concave portion 196 extending upwardly in the downstream direction of the fluid flow path 52 from a seat 188 such that the ball rests within the concave portion 196 and against a face 190 of the seat 188 under the force of gravity G in the closed state of the check valve 156. The seat 188 generally surrounds and is generally perpendicular to the direction of the flow path 52 from the fill outlet 46 such that the upstream fluid force of steam S from the conduit 54 toward the fill outlet 46 urges the ball 192 into further engagement with the seat 188 in a similar manner to the flap 76 discussed above, to further seal the valve 156 and maintain any steam S outside of the cavity 50 (FIG. 9).

The ball-receiving portion 194 of the interior 174 of the valve body 172 can further define an upper cavity 186 extending vertically above the concave portion 196 of the interior 174. In this manner, the ball 192 is permitted space to float upward and out of the flow path 52 by being positioned within the upper cavity 186 in the presence of water W to configure the valve 156 in the open state S2 (FIG. 8). The upper cavity 186 can include an access opening 184 enclosed by a cover 182 by fasteners 198 or the like to allow the ball 192 to be assembled within the interior 174 and for maintenance access or the like.

The invention disclosed herein is further summarized in the following paragraphs and is further characterized by combinations of any and all of the various aspects described therein.

According to another aspect of the present disclosure, an oven includes a cooking chamber, a cabinet at least partially surrounding the cooking chamber, and a water reservoir having a reservoir inlet and a reservoir outlet, the oven being configured to extract water from the water reservoir via the reservoir outlet to supply steam to the cooking chamber. The oven further includes a water fill assembly including an opening, a water-receiving cavity and a fill outlet from the water-receiving cavity, the water fill assembly defining a fluid flow path in from the opening and out through the fill outlet, a check valve in fluid communication with the fill outlet downstream of the fluid flow path defined by the water fill assembly, the check valve configured in a closed state under a force of gravity on at least a portion thereof and opening by a flow force of fluid out of the fill outlet and through the check valve, and a conduit connecting the check valve with the water reservoir inlet downstream of the fill outlet.

The oven may further include a front face, and the water fill assembly may include a drawer body having an outer surface and defining the opening, the water-receiving cavity, and the fill outlet and a holder slidably receiving the drawer body, the outlet being defined on the holder and fluidly connected with the drawer body being slideable with respect to the holder between a fill position, wherein the opening to the cavity is exposed to an environment surrounding the oven and the outer surface of the drawer is generally coplanar with the front face of the oven, and a closed position, wherein the drawer body is retracted into the holder.

The check valve can include a valve body defining a portion of the fluid flow path between the fill outlet and the conduit through an interior thereof and a flap rotatably mounted within the interior of the body, the flap defining the portion of the check valve configurable between the closed state and the open state.

The flap can be rotatably mounted within the interior of the valve body about a hinge disposed along an upper portion of the flap such that the flap rotates vertically upward away from the fill outlet by the flow force of fluid out of the fill outlet and through the check valve.

The valve body can define a shoulder having a face disposed away from the fill outlet, the flap being urged against the shoulder under an upstream fluid force from the conduit toward the fluid outlet.

The flap can be mounted on a cap that is coupleable over an access opening to the interior of the check valve body disposed vertically above the fluid flow path such that the flap depends downwardly from the cap into the fluid flow path when in the closed state.

The check valve can include a valve body defining a portion of the fluid flow path between the fill outlet and the conduit through an interior thereof and a ball movably captured within a portion of the interior of the body, the ball defining the portion of the check valve configurable between the closed state and the open state.

The valve body interior can define a seat surrounding and generally perpendicular to a direction of the flow path from the fill outlet and a concave portion extending upwardly in a downstream direction from the seat such that the ball rests within the concave portion and against the seat under the force of gravity in the closed state of the check valve.

An upstream fluid force from the conduit toward the fill outlet may urge the ball into further engagement with the seat.

The valve body interior can further define a receiving cavity extending vertically above the concave portion of the valve body interior, the ball being positioned within the receiving cavity when the valve is in the open state.

The ball can have a density less than a density of water such that the ball floats into the open state under the flow of fluid through the check valve.

According to yet another aspect, a water storage assembly for an oven configured for to supply steam to a cooking chamber thereof includes a water reservoir having a reservoir inlet and a reservoir outlet, the oven extracting water from the water reservoir via the reservoir outlet and a water fill assembly including an opening, a water-receiving cavity and a fill outlet from the water-receiving cavity, the water fill assembly defining a fluid flow path in from the opening and out through the fill outlet. The assembly further includes a check valve in fluid communication with the fill outlet downstream of the fluid flow path defined by the water fill assembly, the check valve closing under a force of gravity on at least a portion thereof to prevent a backflow against the fluid path and into the water fill assembly and opening to allow an infill of water from the water-receiving cavity through the check valve and a conduit connecting the check valve with the water reservoir inlet downstream of the fill outlet.

The check valve can include a valve body defining a portion of the fluid flow path between the fill outlet and the conduit through an interior thereof and a flap rotatably mounted within the interior of the body, the flap defining the portion of the check valve closing under the force of gravity and opening to allow water from the water-receiving cavity through the check valve.

The flap can be rotatably mounted within the interior of the valve body about a hinge disposed along an upper portion of the flap such that the flap rotates vertically upward away from the fill outlet to allow the infill of water through the check valve.

The valve body can define a shoulder having a face disposed away from the fill outlet, the flap being urged against the shoulder under the backflow against the fluid path through the check valve.

The flap can be mounted on a cap that is coupleable over an access opening to the interior of the check valve body disposed vertically above the fluid flow path such that the flap depends downwardly from the cap into the fluid flow path when closing under the force of gravity.

The check valve can include a valve body defining a portion of the fluid flow path between the fill outlet and the conduit through an interior thereof and a ball movably captured within a portion of the interior of the body, the ball defining the portion of the check valve closing under the force of gravity and opening to allow water from the water-receiving cavity through the check valve, wherein the ball has a density less than a density of water such that the ball floats into the open state under the flow of fluid through the check valve.

The valve body interior can define a seat surrounding and generally perpendicular to a direction of the flow path from the fill outlet, a concave portion extending upwardly in a downstream direction from the seat such that the ball rests within the concave portion and against the seat under the force of gravity in the closed state of the check valve, and a receiving cavity extending vertically above the concave portion of the valve body interior, the ball being positioned within the receiving cavity when the valve is in the open state.

The backflow against the fluid path through the check valve may urge the ball into further engagement with the seat.

According to yet another aspect, an oven includes a cooking chamber, a cabinet at least partially surrounding the cooking chamber, a water reservoir having a reservoir inlet and a reservoir outlet, the oven being configured to extract water from the water reservoir via the reservoir outlet to supply steam to the cooking chamber, and a water fill assembly including an opening, a water-receiving cavity and a fill outlet from the water-receiving cavity. The water fill assembly defines a fluid flow path in from the opening and out through the fill outlet. A conduit connects with the water reservoir inlet downstream of the fill outlet, and a gravity-closing check valve is in fluid communication between the fill outlet and the conduit. The check valve allows a flow of fluid out of the fill outlet and through the check valve and preventing a backflow of steam from the conduit and into the water fill assembly.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An oven comprising:
a cooking chamber;
a cabinet at least partially surrounding the cooking chamber;
a water reservoir having a reservoir inlet and a reservoir outlet, the oven being configured to extract water from the water reservoir via the reservoir outlet to supply steam to the cooking chamber;
a water fill assembly including an opening, a water-receiving cavity and a fill outlet from the water-receiving cavity, the water fill assembly defining a fluid flow path in from the opening and out through the fill outlet;
a check valve, including a body extending outwardly from and in fluid communication with the fill outlet so as to be positioned downstream of the fluid flow path defined by the water fill assembly, the check valve configured in a closed state under a force of gravity on at least a portion thereof and opening by a flow force of fluid out of the fill outlet and through the check valve; and a conduit connecting the check valve with the water reservoir inlet downstream of the fill outlet.

2. The oven of claim 1, further including a front face, wherein the water fill assembly includes:
   a drawer body having an outer surface and defining the opening, the water-receiving cavity, and the fill outlet; and
   a holder slidably receiving the drawer body, with the drawer body being slideable with respect to the holder between a fill position, wherein the opening to the cavity is exposed to an environment surrounding the oven and the outer surface of the drawer body is generally coplanar with the front face of the oven, and a closed position, wherein the drawer body is retracted into the holder.

3. The oven of claim 1, wherein the check valve includes:
   a valve body defining a portion of the fluid flow path between the fill outlet and the conduit through an interior thereof; and
   a flap rotatably mounted within the interior of the valve body, the flap defining a portion of the check valve configurable between the closed state and an open state.

4. The oven of claim 3, wherein the flap is rotatably mounted within the interior of the valve body about a hinge disposed along an upper portion of the flap such that the flap rotates vertically upward away from the fill outlet by the flow force of fluid out of the fill outlet and through the check valve.

5. The oven of claim 4, wherein the valve body defines a shoulder having a face disposed away from the fill outlet, the flap being urged against the shoulder under an upstream fluid force from the conduit toward a fluid outlet.

6. The oven of claim 4, wherein the flap is mounted on a cap coupleable over an access opening to the interior of the check valve body disposed vertically above the fluid flow path such that the flap depends downwardly from the cap into the fluid flow path when in the closed state.

7. The oven of claim 1, wherein the check valve includes a ball movably captured within a portion of the interior of the valve body, the ball defining a portion of the check valve configurable between the closed state and an open state.

8. The oven of claim 7, wherein the valve body interior defines:
   a seat surrounding and generally perpendicular to a direction of the flow path from the fill outlet; and
   a concave portion extending upwardly in a downstream direction from the seat such that the ball rests within the concave portion and against the seat under the force of gravity in the closed state of the check valve.

9. The oven of claim 8, wherein an upstream fluid force from the conduit toward the fill outlet urges the ball into further engagement with the seat.

10. The oven of claim 8, wherein the valve body interior further defines the water receiving cavity extending vertically above the concave portion of the valve body interior, the ball being positioned within the receiving cavity when the valve is in the open state.

11. The oven of claim 8, wherein the ball has a density less than a density of water such that the ball floats into the open state under the flow of fluid through the check valve.

12. A water storage assembly for an oven configured for to supply steam to a cooking chamber thereof, the water storage assembly comprising:
   a water reservoir having a reservoir inlet and a reservoir outlet, the oven extracting water from the water reservoir via the reservoir outlet;
   a water fill assembly including an opening, a water-receiving cavity and a fill outlet from the water-receiving cavity, the water fill assembly defining a fluid flow path in from the opening and out through the fill outlet;
   a check valve in fluid communication with the fill outlet downstream of the fluid flow path defined by the water fill assembly, the check valve closing under a force of gravity on at least a portion thereof to prevent a backflow against the fluid path and into the water fill assembly and opening to allow an infill of water from the water-receiving cavity through the check valve, wherein the check valve includes:
      a valve body defining a portion of the fluid flow path between the fill outlet and the conduit through an interior thereof; and
      a ball movably captured within a portion of the interior of the valve body, the ball defining the portion of the check valve closing under the force of gravity and the opening to allow water from the water-receiving cavity through the check valve, wherein the ball has a density less than a density of water such that the ball floats into an open state under the flow of fluid through the check valve; and
   a conduit connecting the check valve with the water reservoir inlet downstream of the fill outlet.

13. The water storage assembly of claim 12, wherein the valve body interior defines:
   a seat surrounding and generally perpendicular to a direction of the flow path from the fill outlet;
   a concave portion extending upwardly in a downstream direction from the seat such that the ball rests within the concave portion and against the seat under the force of gravity in a closed state of the check valve; and
   a receiving cavity extending vertically above the concave portion of the valve body interior, the ball being positioned within the receiving cavity when the valve is in the open state.

14. The water storage assembly of claim 13, wherein the backflow against the fluid path through the check valve urges the ball into further engagement with the seat.

15. An oven comprising:
   a cooking chamber;
   a cabinet at least partially surrounding the cooking chamber;
   a water reservoir having a reservoir inlet and a reservoir outlet, the oven being configured to extract water from the water reservoir via the reservoir outlet to supply steam to the cooking chamber;
   a water fill assembly including an opening, a water-receiving cavity and a fill outlet from the water-receiving cavity, the water fill assembly defining a fluid flow path in from the opening and out through the fill outlet;
   a conduit connecting with the water reservoir inlet downstream of the fill outlet; and
   a gravity-closing check valve, including a body extending outwardly from and in fluid communication between the fill outlet and the conduit so as to be portioned downstream of the fluid flow path defined by the water fill assembly, the check valve allowing a flow of fluid out of the fill outlet and through the check valve and preventing a backflow of steam from the conduit and into the water fill assembly.

16. The oven of claim 15, wherein the check valve includes a ball movably captured within a portion of the interior of the valve body, the ball defining a portion of the check valve configurable between the closed state and an open state.

17. The oven of claim 16, wherein the valve body interior defines:
- a seat surrounding and generally perpendicular to a direction of the flow path from the fill outlet; and
- a concave portion extending upwardly in a downstream direction from the seat such that the ball rests within the concave portion and against the seat under the force of gravity in the closed state of the check valve.

18. The oven of claim 16, wherein an upstream fluid force from the conduit toward the fill outlet urges the ball into further engagement with the seat.

19. The oven of claim 16, wherein the valve body interior further defines the water receiving cavity extending vertically above the concave portion of the valve body interior, the ball being positioned within the receiving cavity when the valve is in the open state.

20. The oven of claim 16, wherein the ball has a density less than a density of water such that the ball floats into the open state under the flow of fluid through the check valve.

* * * * *